(12) United States Patent
Chen et al.

(10) Patent No.: US 11,132,624 B2
(45) Date of Patent: Sep. 28, 2021

(54) MODEL INTEGRATION METHOD AND DEVICE

(71) Applicant: ADVANCED NEW TECHNOLOGIES CO., LTD., Grand Cayman (KY)

(72) Inventors: Lujia Chen, Hangzhou (CN); Licui Gao, Hangzhou (CN); Wenbiao Zhao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/806,324

(22) Filed: Mar. 2, 2020

(65) Prior Publication Data
US 2020/0202255 A1  Jun. 25, 2020

Related U.S. Application Data

(63) Continuation of application No. PCT/CN2018/111796, filed on Oct. 25, 2018.

(30) Foreign Application Priority Data

Dec. 15, 2017 (CN) .......................... 201711352413.6

(51) Int. Cl.
*G06N 20/00* (2019.01)
*G06N 5/02* (2006.01)
(Continued)

(52) U.S. Cl.
CPC .............. *G06N 20/00* (2019.01); *G06N 5/02* (2013.01); *G06N 5/04* (2013.01); *G06Q 40/08* (2013.01)

(58) Field of Classification Search
CPC ............ G06N 20/00; G06N 5/02; G06N 5/04; G06Q 40/08
See application file for complete search history.

(56) References Cited

U.S. PATENT DOCUMENTS

| 5,881,268 A | 3/1999 | Mcdonald et al. |
| 6,560,592 B1 | 5/2003 | Reid et al. |

(Continued)

FOREIGN PATENT DOCUMENTS

| CA | 2560062 A1 | 9/2005 |
| CN | 1605958 A | 4/2005 |

(Continued)

OTHER PUBLICATIONS

Wang, "Mining Concept-Drifting Data Streams Using Ensemble Classifiers", 2003 (Year: 2003).*

(Continued)

*Primary Examiner* — Ann J Lo
*Assistant Examiner* — Van C Mang (57) ABSTRACT

A model integration method and device are provided. The method includes: obtaining an integrated model, the integrated model having one integrated output value and a plurality of input values, the plurality of input values corresponding to a plurality of output values of a plurality of independent models; performing one or more iterations of optimizing process until a preset iteration stop condition is satisfied: acquiring a prediction output by the integrated model based on a preset test event set; determining an index value of the integrated model based on the prediction output, the index value indicates a performance evaluation of the integrated model; if the index value fails to meet a preset performance requirement; after the preset iteration stop condition is satisfied, determining the integrated model as acceptable.

20 Claims, 3 Drawing Sheets

(51) Int. Cl.
*G06N 5/04* (2006.01)
*G06Q 40/08* (2012.01)

(56) References Cited

U.S. PATENT DOCUMENTS

| | | | |
|---|---|---|---|
| 6,574,778 | B2 | 6/2003 | Chang et al. |
| 6,792,431 | B2 | 9/2004 | Tamboli et al. |
| 6,925,621 | B2 | 8/2005 | Mielke et al. |
| 6,976,020 | B2 | 12/2005 | Anthony et al. |
| 7,131,107 | B2 | 10/2006 | Wall et al. |
| 7,330,767 | B2 | 2/2008 | Thiele et al. |
| 7,343,268 | B2 | 3/2008 | Kishikawa |
| 7,721,336 | B1 | 5/2010 | Adjaoute |
| 7,933,849 | B2 | 4/2011 | Bartee et al. |
| 8,195,436 | B2 | 6/2012 | Tolone et al. |
| 8,417,360 | B2 | 8/2013 | Sustaeta et al. |
| 8,515,862 | B2 | 8/2013 | Zhang et al. |
| 9,195,445 | B1 | 11/2015 | Shakeri et al. |
| 2012/0290505 | A1 | 11/2012 | Eder |
| 2016/0189048 | A1* | 6/2016 | Chang .................. G06K 9/6247 706/12 |
| 2017/0330109 | A1* | 11/2017 | Maughan ................ G06N 20/00 |
| 2018/0308160 | A1 | 10/2018 | Liu |

FOREIGN PATENT DOCUMENTS

| | | |
|---|---|---|
| CN | 102567391 A | 7/2012 |
| CN | 102693452 A | 9/2012 |
| CN | 105719002 A | 6/2016 |
| CN | 105843991 A | 8/2016 |
| CN | 105930900 A | 9/2016 |
| CN | 106650786 A | 5/2017 |
| CN | 106677763 A | 5/2017 |
| CN | 106991506 A | 7/2017 |
| CN | 107025596 A | 8/2017 |
| CN | 108596415 A | 9/2018 |
| EP | 1090275 A1 | 4/2001 |
| WO | 9967602 A1 | 12/1999 |

OTHER PUBLICATIONS

Kolter, "Dynamic Weighted Majority: An Ensemble Method for Drifting Concepts", 2007 (Year: 2007).*
Bickerman, "Learning to Create Jazz Melodies Using Deep Belief Nets", 2010 (Year: 2010).*
Tilmann Gneiting, "Strictly Proper Scoring Rules, Prediction, and Estimation" 2007 (Year: 2007).*
Yan Yan, Xu-Cheng Yin, "Sorting-Based Dynamic Classifier Ensemble Selection", IEEE, 2013 (Year: 2013).*
Monira "An Adaptive Ensemble Method for Quantitative Rainfall Forecast", IEEE, 2011 (Year: 2011).*
Search Report for European Application No. 18 889 736.7 dated Jun. 15, 2020.
Supplementary Search for Chinese Application No. 201711352413.6 dated Jun. 8, 2020.
Second Office Action for Chinese Application No. 201711352413.6 dated Jun. 16, 2020.
International Preliminary Report on Patentability Chapter I for PCT Application No. PCT/CN2018/111796 dated Jun. 25, 2020.
Written Opinion of the International Searching Authority and International Search Report for PCT Application No. PCT/CN2018/111796 dated Jan. 22, 2019 (xx pages).
Search Report for Taiwanese Application No. 107135753 dated Sep. 27, 2019 (1 page).
First Search Report for Chinese Application No. 201711352413.6 dated Feb. 13, 2020 (1 page).

* cited by examiner

MODEL INTEGRATION METHOD AND DEVICE

CROSS REFERENCE TO RELATED APPLICATION

The present application is a continuation application of International Patent Application No. PCT/CN2018/111796, filed on Oct. 25, 2018, which claims priority to Chinese Patent Application No. 201711352413.6, filed on Dec. 15, 2017. The entire content of the above referenced applications is incorporated herein by reference.

TECHNICAL FIELD

The embodiments of the specification relate to the technical field of data processing, and more particularly relates to a model integration method and device.

BACKGROUND

The essence of intelligent or automated processing is a process in which a computer acquires corresponding output information after calculation according to input information, and a model is a piece of information configured to describe the aforementioned input-output relationship. Simple models may be constructed based on an artificial rule. In the data age, data modeling based on big data and machine learning technologies has become a mainstream. At present, in various application fields, the big data modeling has been widely configured to achieve various intelligent processing functions. However, with the increase of the number of models, problems such as difficulty in management and excessive resource consumption have arisen correspondingly.

A risk control system is taken as an example. At present, a model-driven risk control strategy has been widely used, especially for some integrated business platforms. Various models may be constructed based on big data in different scenarios and different dimensions, thereby realizing comprehensive risk control. However, with the continuous perfection of risk prediction coverage, the number of models has also increased. As time passes, the entire risk control system will continuously increase in size, which may make the management and maintenance cost uncontrollable. Furthermore, since redundancy often exists between different models, unnecessary consumption of system processing resources may also occur.

SUMMARY

For the above technical problems, the embodiments of the specification provide a model integration method and device. The technical solutions are as follows.

According to a first aspect of the embodiment of the specification, a model integration method is provided. The method includes: obtaining an integrated model, the integrated model having one integrated output value and a plurality of input values, the plurality of input values corresponding to a plurality of output values of a plurality of independent models; performing one or more iterations of optimizing process until a preset iteration stop condition is satisfied, wherein the optimizing process comprises: acquiring a prediction output by the integrated model based on a preset test event set; determining an index value of the integrated model based on the prediction output, the index value indicates a performance evaluation of the integrated model; if the index value fails to meet a preset performance requirement, optimizing the integrated model based on a preset optimization event set by performing one or more of following adjustments, wherein the preset optimization event set is different from the preset test event set: refitting the integrated model by adjusting a plurality of integration weights respectively corresponding to the plurality of independent models; and refitting one or more of the plurality of independent models by adjusting one or more parameters associated with each of the one or more independent models, wherein each of the parameters corresponds to an input to the each independent model; and after the preset iteration stop condition is satisfied, determining the integrated model as acceptable.

In some embodiments, the preset iteration stop condition comprises a requirement that the index value satisfies the preset performance requirement, or a number of the one or more iterations reaches a preset threshold.

In some embodiments, the optimizing the integrated model comprises: performing the refitting the integrated model in a first iteration; and if the preset performance requirement is not satisfied, performing the refitting one or more of the plurality of independent models in subsequent iterations.

In some embodiments, the optimizing the integrated model further comprises: retraining the integrated model to acquire a new integrated model after removing one or more independent models from the plurality of independent models to provide inputs to the integrated model, or after adding one or more new independent models to the plurality of independent models to provide inputs to the integrated model.

In some embodiments, the refitting one or more of the plurality of independent models comprises: sorting the plurality of independent models based on the plurality of corresponding integration weights; selecting one of the plurality of independent models that have not been refitted and has a highest integration weight; and refitting the selected independent model.

In some embodiments, the optimizing the integrated model further comprises: retraining one or more of the plurality of independent models to acquire one or more new independent models after removing or adding input features to each of the one or more independent models.

In some embodiments, the obtaining an integrated model comprises: obtaining a set of historical event data records, each comprising a plurality of predicted values generated by the plurality of independent models and an integrated label value, wherein each of the plurality of predicted values is within a predicted value range associated with the corresponding independent model; dividing the predicted value range associated with the corresponding independent model into a plurality of subintervals, wherein each of the plurality of predicted values falls into one of the plurality of subintervals; converting, for each of the set of historical event data records, the plurality of predicted values respectively to a plurality of encoded values; obtaining a training data set based on the set of historical event data records, wherein each training data of the training data set is associated with a plurality of eigenvalues determined based on the plurality of corresponding encoded values; and training the integrated model by a supervised learning algorithm based on the training data set.

In some embodiments, the converting, for each of the set of historical event data records, the plurality of predicted values respectively to a plurality of encoded values comprises: converting the plurality of predicted values respectively to a plurality of One-Hot encoded values, wherein each of the plurality of One-Hot encoded values comprises a plurality of bits, and a quantity of the plurality of bits equals to a quantity of the plurality of subintervals.

In some embodiments, the converting, for each of the set of historical event data records, the plurality of predicted values respectively to a plurality of encoded values comprises: for each independent model of the plurality of independent models, determining a plurality of weight of evidence (WOE) scores respectively for the plurality of subintervals; and converting each predicted value from the independent model to a WOE score corresponding to a subinterval of the plurality of subintervals in which the each predicted value belongs.

According to a second aspect of the embodiment of the specification, a model integration system is provided. The system comprises one or more processors and one or more non-transitory computer-readable memories coupled to the one or more processors and configured with instructions executable by the one or more processors to cause the system to perform operations comprising: obtaining an integrated model, the integrated model having one integrated output value and a plurality of input values, the plurality of input values corresponding to a plurality of output values of a plurality of independent models; performing one or more iterations of optimizing process until a preset iteration stop condition is satisfied, wherein the optimizing process comprises: acquiring a prediction output by the integrated model based on a preset test event set; determining an index value of the integrated model based on the prediction output, the index value indicates a performance evaluation of the integrated model; if the index value fails to meet a preset performance requirement, optimizing the integrated model based on a preset optimization event set by performing one or more of following adjustments, wherein the preset optimization event set is different from the preset test event set: refitting the integrated model by adjusting a plurality of integration weights respectively corresponding to the plurality of independent models; and refitting one or more of the plurality of independent models by adjusting one or more parameters associated with each of the one or more independent models, wherein each of the parameters corresponds to an input to the each independent model; and after the preset iteration stop condition is satisfied, determining the integrated model as acceptable.

According to a third aspect of the embodiment of the specification, a non-transitory computer-readable storage medium for model integration is provided. The storage medium is configured with instructions executable by one or more processors to cause the one or more processors to perform operations comprising: obtaining an integrated model, the integrated model having one integrated output value and a plurality of input values, the plurality of input values corresponding to a plurality of output values of a plurality of independent models; performing one or more iterations of optimizing process until a preset iteration stop condition is satisfied, wherein the optimizing process comprises: acquiring a prediction output by the integrated model based on a preset test event set; determining an index value of the integrated model based on the prediction output, the index value indicates a performance evaluation of the integrated model; if the index value fails to meet a preset performance requirement, optimizing the integrated model based on a preset optimization event set by performing one or more of following adjustments, wherein the preset optimization event set is different from the preset test event set: refitting the integrated model by adjusting a plurality of integration weights respectively corresponding to the plurality of independent models; and refitting one or more of the plurality of independent models by adjusting one or more parameters associated with each of the one or more independent models, wherein each of the parameters corresponds to an input to the each independent model; and after the preset iteration stop condition is satisfied, determining the integrated model as acceptable.

By the application of the technical solutions provided by the embodiments of the specification, on one hand, scores of the plurality of independent models may be integrated into one integrated score, so that an output model strategy is more convenient to manage, the problem of redundancy caused by many models is also solved, and the use efficiency of system processing resources is improved. On the other hand, for a model acquired by integration, iterative optimization of the integrated model is automatically triggered based on performance monitoring and prewarning, thus ensuring that the integrated score is stably and effectively output.

The foregoing general description and detailed description in the following are used for merely exemplary and interpretive, but cannot constitute a limitation to the embodiments of the specification. In addition, any of the embodiments of the specification may not achieve all the effects described above.

BRIEF DESCRIPTION OF THE DRAWINGS

To describe the technical solutions in the embodiments of the specification or in the existing technologies more clearly, the following briefly describes the accompanying drawings required for describing the embodiments or the existing technologies. Apparently, the accompanying drawings in the following description show merely some embodiments recorded in the embodiments of the specification, and a person of ordinary skill in the art may still derive other drawings from these accompanying drawings.

DETAILED DESCRIPTION

For a better understanding of the technical solutions in the embodiments of the specification by those skilled in the art, the technical solutions in the embodiments of the specification will be described in detail below with reference to the accompanying drawings in the embodiments of the specification. Obviously, the described embodiments are some rather than all of the embodiments of the specification. All other embodiments obtained by a person of ordinary skill in the art based on the embodiments of the specification shall fall within the protection scope of the specification.

A risk control scenario in the financial field is taken as an example. A model-driven risk control system may consider a variety of risk types. For different risk types, different risk control models may be constructed, such as an anti-fraud model, an anti-theft model, and an anti-cheating model. In each risk type, various special models may be designed for different scenarios and different dimensions. For example, the anti-fraud model may be further subdivided into an offline fraudster model, an offline fraud card model, an online FP (transfer to account) model, an online FZ (transfer to card) model, a part-time job scam model, and the like. In order to prevent skipping risks, most of model strategies use a plurality of models in combination (e.g., each model is associated with a score, a threshold and a certain rule). For example, the following two strategies may be used in combination:

Strategy 1: the score of a model A is more than 0.5, and a transaction amount is more than 10 YUAN;

Strategy 2: the score of a model B is more than 0.6, parties involved in a transaction does not have a strong relationship, and the transaction amount is more than 100 YUAN.

The addition of every new model requires a new model strategy. In the long run, after a certain period of time of accumulation, the model strategies would be redundant, and the cost increase would be uncontrollable. For the above problems, the specification provides that: an overall score may be output after standardizing and integrating the output scores of different models. Therefore, an output model strategy may be more convenient to manage, the problem of redundancy caused by too many models may be solved, and the use efficiency of system processing resources may be improved. On the other hand, for a model acquired by integration, iterative optimization of the integrated model may be automatically triggered based on performance monitoring and prewarning, thus ensuring that the integrated score is stably and effectively output.

Figure 1:
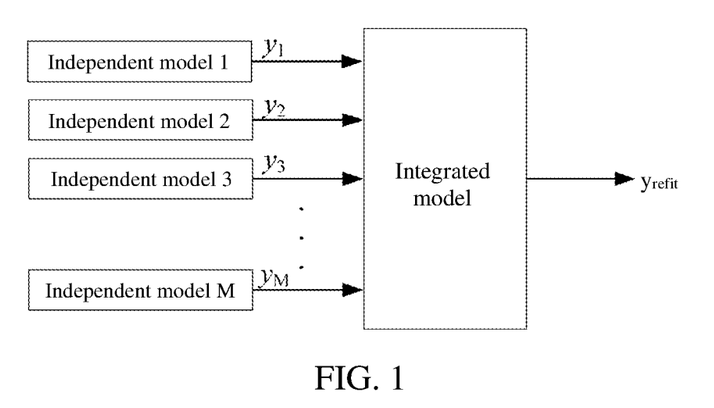
FIG. 1 is a schematic diagram of a relation between an integrated model and independent models according to the embodiment of the specification.

FIG. 1 is a schematic diagram of a relation between an integrated model and independent models. Outputs of a plurality of independent models are integrated to acquire 1 integrated model. Each independent model has 1 output value. The output values of the plurality of independent models are integrated through the integrated model to output 1 integrated output value.

A model integration solution provided by the specification is described below from two aspects "construction of the integrated model" and "optimization of the integrated model."

Figure 2:
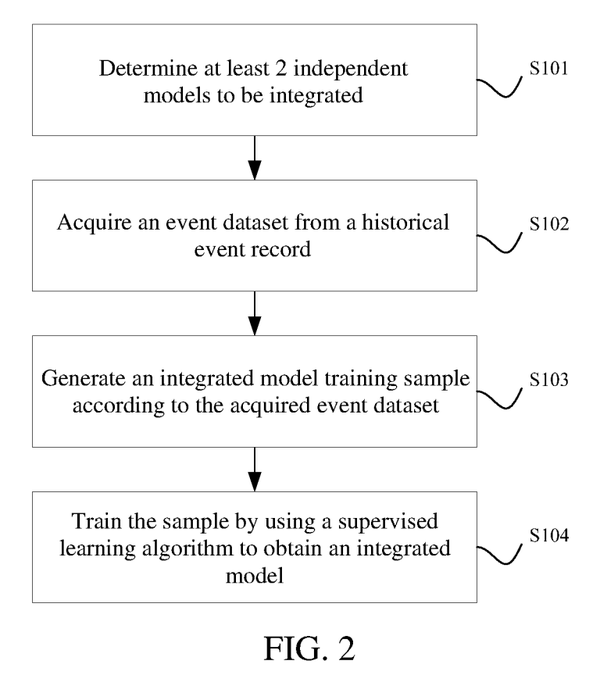
FIG. 2 is a flow diagram of an integrated model construction method according to the embodiment of the specification.

FIG. 2 is a flow diagram of an integrated model construction method provided by the specification. The method may include the following steps.

At S101, at least 2 independent models to be integrated are determined. Firstly, a plurality of independent models that need to participate in the integration are determined, such as an offline fraudster model, an offline fraud card model, an online FP (transfer to account) model, and an online FZ (transfer to card) model. Each independent model has a predicted output score of 1 special risk and several input features, and different independent models may reuse a same input feature.

In order to ensure the performance of the integrated model, independent models with relatively good performance may be selected here. The criteria for the "relatively good performance" here may be relatively high prediction coverage, relatively high accuracy, relatively low interruption rate, and the like. It is the best for the independent models to have a certain extra output gain. For example, in some embodiments, the following independent models may be selected for the integration: a terminal model (referring to a risk identification model deployed on a mobile phone client), a low-risk identification model, an online risk identification model, and an offline risk identification model. The specification does not limit a specific solution for selecting an independent model. In addition, the independent model here may also be a model constructed based on rules, and is not limited to a "model constructed by using machine learning" in a narrow sense.

At S102, an event data set is acquired from a historical event record.

For the independent models that participate in the integration determined in S101, event data is acquired from the historical event record. An event record that has occurred within a certain time window (for example, in the past week, and the past month) may be used as a data source. For any event j, the data to be acquired includes: a) a predicted output value of each independent model for the event j; and b) an integrated risk label value of the event j. As shown in Table 1:

TABLE 1

| Event id | Score of the model 1 | Score of the model 2 | Score of the model 3 | Integrated risk label |
|---|---|---|---|---|
| 1 | 0.1 | 0.01 | 0.3 | 0 |
| 2 | 0.55 | 0.3 | 0.6 | 1 |
| 3 | 0.9 | 0.8 | 0.9 | 1 |
| ... | | | | |

The "risk label" may refer to a judgment result of whether a certain event actually constitutes a case (e.g., an actual fraud case). It may be noted that the result is not necessarily completely consistent with a prediction result of each model. The label value may be determined based on manual annotation or determined according to whether a user reports the case. The specification does not limit a specific source of the label value.

At S103, an integrated model training sample is generated according to the acquired event data set. Ideally, the event data set acquired in S102 may be directly used as a training sample. That is, for any event j, the score of each independent model A is directly used as an input feature value of the integrated model, and the integrated risk label value is used as a label value of the integrated model. In some embodiments, the acquired event data set may be further processed for subsequent training.

According to the needs of model training, the processing method here may include performing conventional processing on the output value of each independent model, such as standardization and normalization, so as to map the output value of each independent model to a certain numeric interval.

In order to make the eigenvalue expression of the integrated model more precise, the range of each independent model may also be divided into several subintervals. For the same model, when the output value of the model is in different subintervals, it may be mapped into different values. The specific processing is as follows.

At S103a, subinterval division is performed. It is assumed that there are M independent models participating in the integration. For any independent model i, a range of the output value of i may be divided into $L_i$ subintervals ($L_i \geq 2$, i=1, 2, 3 . . . M). According to actual meanings or characteristics of the output values of different models, the same or different range subinterval division methods (such as division rules of subintervals and a number of subintervals) may be used for different models.

In some embodiments, for the event data set acquired in S102, the range of the output value of each independent model may be divided into a plurality of subintervals according to the distribution of the output values of the various events by the independent model i.

For example, it is assumed that the risk prediction output score is in the interval [0,1], and the higher the score, the higher the event risk. In a risk control scenario, high-accuracy, high-coverage and low-disturbance performance index requirements are comprehensively considered. During selection of a critical value of risk judgment, it is generally more sensitive to higher scores, and correspondingly, the division granularity for an interval with high scores is more precise. For an interval with low scores, a relatively coarse division granularity may be used. Based on the above requirements, division strategies that are usable are illustrated below: firstly, independent model scores of all data are sorted, and then the following division is made according to a sorting result:

an interval corresponding to scores sorted in the top 0.01% is divided into 10 subintervals;

an interval corresponding to scores sorted in the top 0.01% to 1% is divided into 100 subintervals;

an interval corresponding to scores sorted in the top 1% to 5% is divided into 20 subintervals;

an interval corresponding to scores sorted in the top 5% to 100% is divided into 1 subinterval.

That is, the range interval [0,1] is planned to be divided into 131 subintervals.

The above division method is described below by using a simplified example. The data shown in Table 1 is taken as an example. It is assumed that the output scores of 3 models are in the interval [0,1] which is divided into 3 subintervals. The division principle is to: divide the intervals corresponding to the scores sorted in the previous 0 to 15%, 15% to 50%, and 50% to 100% into 1 subinterval, respectively. It is assumed that by counting the distribution ratios of all the data (only 3 pieces of data are shown in FIG. 1) in the output values of the various models, the following range subinterval division results may be acquired:

TABLE 2

| Range subinterval | Model 1 | Model 2 | Model 3 |
| --- | --- | --- | --- |
| Subinterval 1 | (0.85, 1] | (0.3, 1] | (0.6, 1] |
| Subinterval 2 | (0.5, 85] | (0.005, 0.3] | (0.3, 0.6] |
| Subinterval 3 | (0, 0.5] | (0, 0.005] | (0, 0.3] |

It may be seen that since the distribution ratios of the actual data are used as a basis for dividing range subintervals, even if the different independent models have the same number of subintervals, and the same distribution ratios of the output values corresponding to the subintervals, the endpoints of the subintervals are not necessarily the same.

The foregoing division method and example are only for illustrative descriptions, and may not be construed as limiting the solution of the specification. In addition, In some embodiments, different independent models may select different subinterval division methods, and those skilled in the art may select the methods according to actual needs.

At S103b, numerical mapping is performed. Based on the divided subintervals, for any output value of the independent model i, a mapping result corresponding to the output value may be determined according to the subinterval in which the output value is located. For any output value of the independent model i, it may correspond to one or more mapped values, illustrated as follows: for any output value of the independent model i, the output value may be converted into a One-Hot encoded value according to the subinterval in which the output value is located.

One-Hot may refer to one-hot encoding, also known as one-bit effective encoding. A method thereof is to use an N-bit state registers to encode N states. Each register bit is independent of each other, and at any time, only one register bit is valid. In the specification, since the output value of the independent model certainly belongs to one of the $L_i$ subintervals, the One-Hot encoded value having the length of $L_i$ may be configured to denote the output value of the independent model: the interval in which the output value is located is correspondingly encoded as 1, and other ($L_i-1$) intervals are encoded as 0. In combination with the aforementioned interval division solution, an original feature value may be further sparsified, so as to play a role of expanding the feature to a certain extent to provide more information for subsequent training and classification of the models.

The data set shown in Table 1 and the subinterval division results shown in Table 2 are taken for an example. The One-Hot encoding results are shown in Table 3:

TABLE 3

| Event | Model 1 | | | Model 2 | | | Model 3 | | |
| --- | --- | --- | --- | --- | --- | --- | --- | --- | --- |
| id | onehot1 | onehot2 | onehot3 | onehot1 | onehot2 | onehot3 | onehot1 | onehot2 | onehot3 |
| 1 | 0 | 0 | 1 | 0 | 0 | 1 | 0 | 0 | 1 |
| 2 | 0 | 1 | 0 | 0 | 1 | 0 | 0 | 1 | 0 |
| 3 | 1 | 0 | 0 | 1 | 0 | 0 | 1 | 0 | 0 |
| . . . | | | | | | | | | |

It may be seen that for any piece of data sample j, the ranges of the M output values of the original M independent models are uniformly divided into L subintervals, and the M output values of the original M independent models become a total of M*L values after being subjected to the One-Hot encoding processing. According to the example in Table 3, M*L is equal to 9, and these 9 values may be used as 9 eigenvalues of the data sample j in the subsequent training process.

For any output value of the independent model i, a weight of evidence (WOE) score of the subinterval in which the output value is located may also be determined as the mapping result of the output value according to the subinterval in which the output value is located.

WOE is also a way to discretize a value. A WOE value expresses the influence of a variable in a certain value on an event result (such as a risk event).

In some embodiments, for any numerical subinterval k, the corresponding WOE value of the subinterval may be defined as:

$$WOE_k = \ln \frac{\text{a number of black samples in the subinterval } k/\text{a number of all the black samples}}{\text{a number of white samples in the subinterval } k/\text{a number of all the white samples}}$$

In the above formula, the "black sample" represents a data sample with an integrated risk label of 1 (risky), and the "white sample" represents a data sample with an integrated risk label of 0 (no risk).

As shown in Table 4, it is assumed that for a certain independent model i, the range is divided into 3 subintervals, and there are totally 1000 samples, including 900 white samples and 100 black samples. The WOE score of each subinterval is calculated as shown in Table 4 according to the distribution of the black/white samples in each subinterval:

TABLE 4

| Range subinterval | Number of black samples | Number of white samples | WOE |
| --- | --- | --- | --- |
| Subinterval 1 | 80 | 50 | =ln[(80/100)/(50/900)] = around 2.67 |
| Subinterval 2 | 15 | 350 | =ln[(15/100)/(350/900)] = around −0.95 |
| Subinterval 3 | 5 | 500 | =ln[(5/100)/(500/900)] = around −2.14 |
| In total | 100 | 900 | |

It may be seen that the WOE value is also acquired statistically based on the sample distribution ratio in each subinterval. The WOE value of each subinterval reflects a difference between the white/black sample ratio of each subinterval and the overall white/black sample ratio. According to the solution in the specification, firstly, for each independent model, the WOE score corresponding to each subinterval of the each independent model is calculated, and then for any output value of the independent model i, the corresponding WOE score of the subinterval in which the output value is located is a mapped value of this output value.

It may be seen that for any piece of data j, the M output values of the original M models are still M values after the WOE encoding processing, and the M values may be used as M eigenvalues of the data sample j in the subsequent training process.

The foregoing numerical mapping method and example are only used for illustrative descriptions, and may not be construed as limiting the solution of the specification. In addition, in some embodiments, the numerical mapping methods selected by different independent models may also be different, and those skilled in the art may select the methods according to actual needs.

S104, a supervised learning algorithm is configured to train the samples to acquire an integrated model. According to the training samples acquired in S103, the supervised learning algorithm may be configured to perform training to acquire the integrated model. The integrated model may have 1 integrated output value, and may take the output values of the plurality of independent models as input values.

In the training process, the training label value of each piece of data sample is an integrated risk label of the data sample, and the training eigenvalue of each piece of data sample is determined according to the processing method of S103. For example, the training eigenvalue may be the output values of the plurality of independent models, and may also be processed results of the output values of the plurality of independent models.

The form of the integrated model may be selected according to actual training needs, such as a linear regression model, and a logistic regression model. The specification does not limit the selection of models and a specific training algorithm.

Since a prediction model is acquired by training based on certain historical data samples, there may be a variety of factors leading to the decline in the applicability of the model as time goes on. Therefore, it may be needed to optimize and refit the model timely. For the integrated model, there is also a need for optimization and refitting. Based on the characteristics of the integrated model, the specification further provides an integrated model optimization method.

Figure 3:
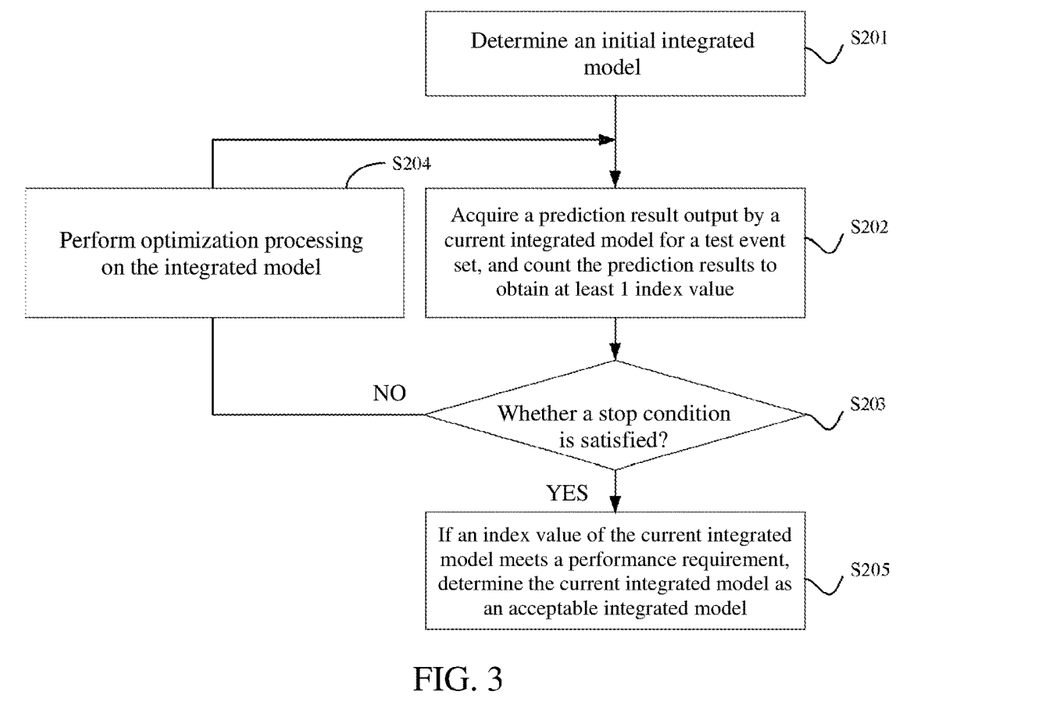
FIG. 3 is a first flow diagram of an integrated model optimization method according to the embodiment of the specification.

FIG. 3 is a flow diagram of the integrated model optimization method provided by the specification. The method may include the following steps.

At S201, an initial integrated model is determined. In the specification, the "initial integrated model" refers to the integrated model before the optimization processing. According to the description of the previous embodiments, the integrated model may be acquired by integrating at least 2 independent models, and have 1 integrated output value and take the output values of the at least 2 independent models as input values.

In the specification, the "initial integrated model" may represent a to-be-optimized state of a model, which may be either a completely unoptimized model after training, or a result of the last optimization. In addition, the "initial integrated model" may be acquired by using the foregoing integrated model training method, or may be acquired in other ways, and the method for acquiring the initial integrated model is not limited in the specification.

At S202, prediction results output by a current integrated model for a preset test event set is acquired, and the prediction results are counted to acquire at least 1 index value. Performance indexes configured to evaluate a risk control prediction model generally include a prediction coverage rate, a prediction hit rate and a user disturbance rate. These indexes are also applicable to the integrated model, and whether these indexes perform well enough is an important basis for determining whether to optimize the integrated model.

In this step, the current integrated model is configured to predict a target event set having known results (i.e., having risk annotation results). Each prediction result is compared with a risk label, and the indexes such as the accuracy and the disturbance rate are stored, so as to determine whether to start the optimization according to these indexes in the subsequent steps. In some embodiments, the test event set may be taken from a certain time window (for example, the latest week, and the latest month), so as to achieve on-demand optimization of the performance of the integrated model.

In addition, according to FIG. 3, in a complete optimization process, enough good optimization may be achieved by a plurality of rounds of iterations. Therefore, these index values may also be used as a judgment basis for "whether to start the next round of optimization" in one complete optimization process. In some embodiments, for different rounds of iterations, the test event set used at each time may be exactly the same, or there may be some differences. For example, the test event set may be divided into a plurality of subsets, and each iteration may perform predictions for one of the subsets, or one portion may be randomly extracted from the test event set for the current iteration.

At S203, whether a preset iteration stop condition is satisfied is determined, and S205 is executed if YES, or S204 is executed if NO.

It may be seen according to the above description that "whether the indexes perform well enough" is the important basis for determining whether to optimize the integrated model. Therefore, the iteration stop condition here may at least include that: the index of the current integrated model meets a preset performance requirement, such as "the user disturbance rate is below 1%," and "the prediction coverage rate is above 90%." When there is a plurality of index values, judgment standards may be set for the various index values, or the various index values may also be comprehensively judged according to a certain strategy. The specification does not limit a specific judgment standard.

It may be understood that the "current integrated model" refers to the "initial integrated model" in the iteration of the $1^{st}$ round, and refers to an integrated model acquired by the optimization of the last round in iterations of the $2^{nd}$ round and later rounds.

In some embodiments, for the initial integrated model, an integrated model prediction result may be acquired periodically (such as once every week and month), and then whether to start the optimization may be determined based on the statistically acquired index values. In other embodiments, the integrated model prediction result may be continuously monitored. A warning prompt may be provided if it is found that the performance indexes do not meet the requirements, which may trigger the optimization process.

In some embodiments, the iteration stop condition here may also be in other forms, such as: iteration may be controlled to be stopped at a certain preset number of iterations; iteration may be controlled to be stopped when a same optimization strategy is used continuously for multiple times, but there is no significant performance improvement; iteration may be controlled to be stopped after all available optimization strategies are executed.

The above iteration stop conditions are only for illustrative descriptions, and may not be construed as limiting the solution in the specification.

At S204, optimization processing is performed on the integrated model. According to the characteristics of the integrated model, the specification provides various integrated model optimization strategies. According to different objects optimized by the strategies, there are two categories on the whole: refitting the integration method of the plurality of independent models, or separately refitting the independent models. Each category of strategies may further include various implementations. Furthermore, in the iterative optimization process, the optimization strategies of different rounds may also generate a richer strategy form. The specific implementation of this step will be described in detail in the following embodiments.

At S205, if the index values of the current integrated model meet the performance requirement, the current integrated model is determined as an acceptable integrated model.

For the initial integrated model or the integrated model acquired after the optimization of any round, if its corresponding index values meet the performance requirement, the model may be used as a final optimization result put into use. If the current model's corresponding index values still do not meet the performance requirement after the iteration processing is stopped, this process may be transferred to other processing processes by manual intervention. The specific processing method is not related to the solution in the specification, and will be no longer described in detail here.

The exemplary overall process of the model optimization has been described above. The optimization strategy involved in S204 may be further explained below. According to the above illustration, the optimization strategy may be divided into two categories from the perspective of "objects to be optimized:" a) the integration method of the plurality of independent models is refitted; and b) the independent models are separately refitted.

In addition, the optimization strategy may also be divided into two categories from the perspective of an "optimization measure:" a) only feature parameters are refitted, instead of changing the input features of the models; and b) the input features of the models are increased or decreased, and then are retrained to acquire a new model.

According to the division of the above two dimensions, possible optimization strategies after permutation and combination are shown in Table 5:

TABLE 5

|  | Independent model | Integrated model |
| --- | --- | --- |
| refit | Independent model refit | Integrated model refit |
| retrain | Independent model retrain | Integrated model retrain |

4 optimization strategies shown in Table 5 are specifically explained below.

Integrated model refit: the integration weights of the independent models in the integrated model are refitted without changing the independent models that participate in the integration. The "integration weights" here may refer to the various eigenvalues of the integrated model (i.e., the parameters for the outputs of the various independent models).

Integrated model retrain: the independent models configured to provide the input values of the integrated model are increased or decreased (e.g., some new independent models are added, and/or some existing independent models are removed), and then are retrained to acquire a new integrated model.

Independent model refit: the various feature parameters (e.g., integration weights) of the independent models are refitted without changing the input features of the independent models.

Independent model retrain: the input features of the independent models are increased or decreased (e.g., some new features are added, and/or some existing features are removed), and then the independent models are retrained to acquire new independent models.

The above illustrates 4 typical optimization strategies, and may not be understood as a limitation on the solution in the specification. For example, for the independent models built based on artificial rules, refitting may be directly implemented by modifying or replacing the rules.

The refitting or retraining may be completed through training. Since the reason that the performance of a model does not meet the standard may be that models available in the past may no longer satisfy the latest situation, events that have occurred recently (such as the latest week, and the latest month) may be selected as an optimization event set, and then supervised training may be performed according to the optimization event set to refit or retrain.

In some embodiments, the "test event set" and the "optimization event set" may be acquired from a same event set. For example, the events that have occurred recently are divided into two parts, one part of which is used for counting the index values and the other part of which is configured to optimize the integrated model.

In one complete model optimization process, one or more optimization strategies shown in Table 5 may be selected. Considering the training cost, the integrated model may be refitted first, and then the independent models may be refitted. Furthermore, the models are refitted first and then retrained. In some embodiments, the number of models or features is not allowed to be increased or decreased arbitrarily, so the use frequency of the retrain strategy may be relatively small.

For example, it is assumed that the integrated model is acquired by integrating 3 independent models, and the model expression is as follows:

$$y_{refit}=h(-0.1+0.7y_1+0.2y_2+0.5y_3)$$

where $y_1$, $y_2$, and $y_3$ respectively denote the outputs of the 3 independent models, and 0.7, 0.2, and 0.5 are the integration weights.

If performance warning occurs, the integration is refitted first by using the optimization event set in the first round of iteration. It is assumed that the refitted integration weights are as follows:

$$y_{refit}=h(-0.2+0.8y_1+0.1y_2+0.4y_3)$$

In this example, the strategy of "retraining the integrated model" is not considered, so if the refitted integrated model still does not meet the performance requirement, integration factor disassembling may be performed to optimize the various independent models separately.

The plurality of independent models may be optimized separately, or may be optimized one by one according to a certain order. For example, based on the integration weight of each independent model in the integrated model, the independent models with relatively high integration weights may be refitted first.

Taking the above $y_{refit}$ expression as an example, it may be seen according to the integration weights that the independent model 1 contributes the most to the integrated output value, followed by the independent model 3 and finally the independent model 2, so the refitting priority of the independent models is 1→3→2.

For the optimization strategy of each independent model, refit may be performed first, and then may be followed by retrain. For the same independent model, since various parameter increase and decrease solutions may be included, a plurality of rounds of retrain may be needed. In some embodiments, for some independent models, retrain may not be performed.

After each round of optimization is completed, performance index values may be acquired by using the test event set. If the performance requirements are met, the optimization is stopped, otherwise, the next round of optimization starts. If the performance requirements are still not met after all the independent models are optimized, further diagnosis may be performed manually.

Figure 4:
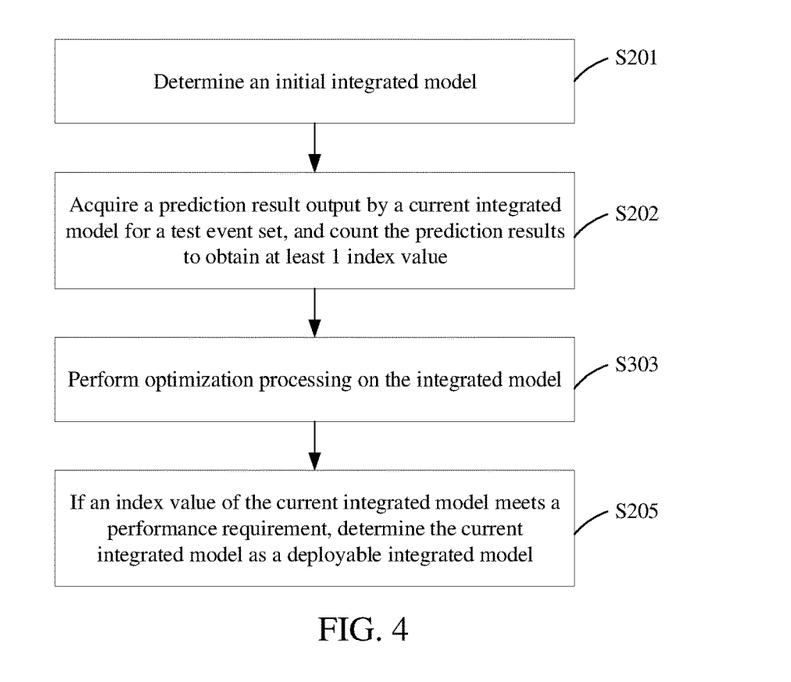
FIG. 4 is a second flow diagram of the integrated model optimization method according to the embodiment of the specification.

FIG. 3 shows an integrated model optimization solution based on a cyclic process, which is characterized by on-demand optimization. That is, an optimization effect is detected after each optimization, and if the requirements are met, the optimization stops. It may be understood that in some cases, the optimization of the integrated model may also be implemented without using an iterative method. For example, a difference between a sequential optimization process shown in FIG. 4 and the cyclic process shown in FIG. 3 is that all the optimization strategies may be performed at one time at Step S303 in FIG. 4. For example, only one optimization strategy is used, or the various optimization strategies are executed according to a fixed rule. All other parts in the sequential process may refer to the descriptions of the corresponding parts in the cyclic process, and descriptions thereof are omitted here.

The model integration solution is described above from "model construction" and "model optimization" respectively. By applying the model construction solution, the scores of the plurality of independent model may be integrated into one integrated score, so that an output model strategy is more convenient to manage, the problem of redundancy caused by too many models may be solved, and the system processing resources use efficiency may be improved. By applying the model optimization solution, for a model acquired by integration, iterative optimization of the integrated model may be automatically triggered based on performance monitoring and prewarning, thus ensuring that the integrated score is stable and effective. It may be seen that the "model construction" and "model optimization" solutions provided in the specification may form a whole together, or they may form separate solutions to solve different technical problems.

It may be understood that except for the risk control scenario, the solution of the specification may still be effectively applied in other application scenarios. For example, in a text semantic identification scenario, there is a plurality of models that use different text feature dimensions to identify semantics. In an image content identification scenario, there is a plurality of models that determine whether an image is a certain thing based on different image features. In a strict identification authentication scenario, there is a plurality of models, such as a facial feature model and a fingerprint feature model, that jointly determine user identities, and so on. In fact, for application scenarios in which various models are constructed by using different features for the same purpose, the solution of the specification may be used for model integration and optimization. Therefore, the examples of the scenarios used in the embodiments of the specification may not be interpreted as limiting the solution of the specification.

Figure 5:
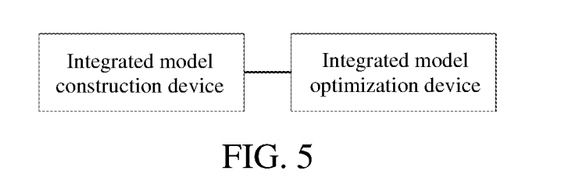
FIG. 5 is a schematic structural diagram of a model integration system according to the embodiment of the specification.

In response to the above method embodiment, the embodiment of the specification further provides a model integration system. As shown in FIG. 5, the system may include two parts: a device for constructing an integrated model and a device for optimizing the integrated model. It may be understood that the above two devices may also be operated independently to solve different technical problems. The two devices are described respectively.

Figure 6:
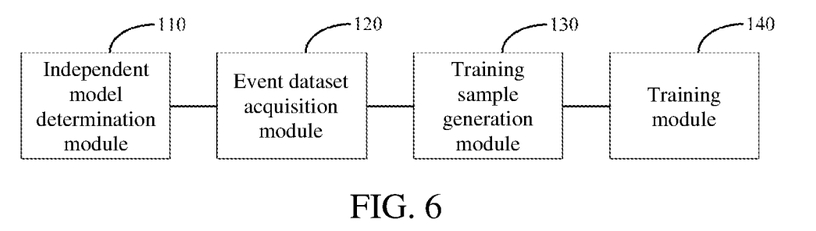
FIG. 6 is a schematic structural diagram of a device for constructing an integrated model according to the embodiment of the specification.

Referring to FIG. 6, the device for constructing the integrated model may include: an independent model determination module 110, configured to determine at least 2 independent models to be integrated, each independent model having 1 output value; an event data set acquisition module 120, configured to acquire an event data set from a historical event record, each piece of event data including: a predicted output value of each independent model for an event and an integrated label value of this event; a training sample generation module 130, configured to generate an integrated model training sample according to the acquired event data set; a training module 140, configured to train the sample by using a supervised learning algorithm to acquire the integrated model. The integrated model has 1 integrated output value, and takes the output values of a plurality of independent models as input values.

In some embodiments, the training sample generation module may be specifically configured to: map the output value of each independent model according to a preset mapping rule, and determine a mapping result as a training eigenvalue for training the integrated model.

In some embodiments, the training sample generation module may map the output value of each independent model by using the following method: a range of the output value of the independent model i is divided into $L_i$ subintervals, wherein $L_i$ is greater than or equal to 2, and i is equal to 1, 2, 3, . . . , M. M is the number of the independent models that participate in the integration; for any output value of the independent model i, the mapping result corresponding to the output value is determined according to the subinterval in which the output value is located.

In some embodiments, the training sample generation module may divide the range of the output value of the independent model i into the $L_i$ subintervals by using the following method: for the event data set acquired, the range of the output value of the independent model i is divided into the $L_i$ subintervals according to the distribution of the output values of the various events by the independent model i.

In some embodiments, the subinterval division numbers $L_i$ corresponding to different independent models i are the same, and the output value distribution ratios corresponding to the subintervals among different independent models are the same.

In some embodiments, the training sample generation module may determine the mapping result of the output value by using the following method: for any output value of the independent model i, a WOE score of the subinterval in which the output value is located is determined as the mapping result of the output value, and each output value of the independent model i corresponds to 1 training eigenvalue; or for any output value of the independent model i, the output value is converted into a One-Hot encoded value having the length of $L_i$ according to the subinterval in which the output value is located, and each output value of the independent model i corresponds to $L_i$ training eigenvalues.

The above device for constructing the integrated model may be further provided with an optimization processing module, configured to perform optimization processing on the integrated model according to a preset optimization event set under the condition of determining that an index value of a current integrated model does not meet the performance requirement. For example, an integration method of the plurality of independent models is refitted, or the independent models are separately refitted. Specific optimization strategy use may refer to other embodiments in the specification, and descriptions thereof are no longer repeated here.

Figure 7:
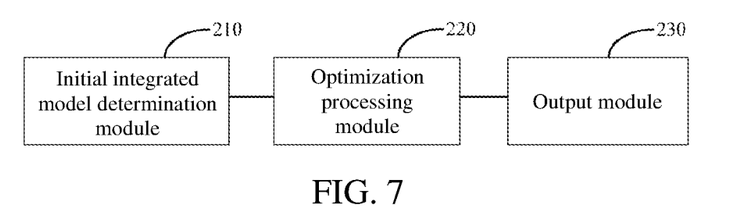
FIG. 7 is a schematic structural diagram of a device for optimizing an integrated model according to the embodiment of the specification.

Referring to FIG. 7, the device for optimizing the integrated model may include: an initial integrated model determination module 210, configured to determine an initial integrated model, the integrated model having 1 integrated output value and taking the output values of at least 2 independent models as input values; an optimization processing module 220, configured to perform iteration processing by using the following submodules until a preset iteration stop condition is satisfied, the iteration stop condition at least including that: an index of a current integrated model index meets a preset performance requirement; a performance evaluation submodule, configured to acquire a prediction result output by the current integrated model for a preset test event set, and count the prediction results to acquire at least 1 index value of the integrated model, the index value being configured to evaluate the performance of the integrated model; an optimization processing submodule, configured to perform optimization processing on the integrated model according to a preset optimization event set, the optimization processing including: refitting an integration method of a plurality of independent models, or separately refitting the independent models; an output module 230, configured to determine the current integrated model as an acceptable integrated model after the iteration is stopped and if the index value of the current integrated model meets the performance requirement.

In some embodiments, the optimization processing submodule may be specifically configured to: in the iteration process, refit the integration method of the plurality of independent models first, and if the performance requirement may not be met, separately refit the independent models in the subsequent rounds of iterations.

In some embodiments, the optimization processing submodule may be specifically configured to refit the integration method of the plurality of independent models by using the following method: integration weights of the independent models in the integrated model are refitted without changing the independent models that participate in the integration; or the independent models configured to provide the input values of the integrated model are increased or decreased, and then are retrained to acquire a new integrated model.

In some embodiments, the optimization processing submodule may be specifically configured to separately refit the independent models by using the following methods: in the iteration process, based on the integration weight of each independent model in the integrated model, the independent models with relatively high integration weights are refitted first. If the performance requirements may not be met, the independent models with relatively low integration weights are refitted in the subsequent rounds of iterations.

In some embodiments, the optimization processing submodule may be specifically configured to separately refit the independent models by using the following methods: parameters of the independent models are refitted without changing the input features of the independent models; or the input features of the independent models are increased or decreased, and then the independent models are retrained to acquire new independent models.

In some embodiments, the test event set for counting the index values and the optimization event set for optimizing the integrated model are a test set and a verification set from a same event set.

Under the condition that the device for optimizing the integrated model shown in FIG. 7 works independently, the initial integrated model determination module may be configured to realize the construction of the integrated model: an event data set is acquired from a historical event record, each piece of event data including: a predicted output value of each independent model for an event, and an integrated label value of this event; the event data set acquired is used as a sample, and the sample is trained by using a supervised learning algorithm to acquire the integrated model.

In addition, in response to the sequential optimization process in the method embodiment, the optimization processing module 220 may further execute the optimization in a non-cyclic manner. For example, only one optimization strategy is used, or various optimization strategies are executed according to a fixed rule. The specific implementation may refer to the foregoing embodiment, and would be no longer repeated here.

The embodiment of the specification further provides computer system, which at least includes a memory, a processor and a computer program stored on the memory and capable of being operated on the processor. The processor executes the program to implement the foregoing model integration method. Specifically, the foregoing integrated model construction method and integrated model optimization method may be implemented simultaneously in one set of system, or may be separately implemented in different system.

Figure 8:
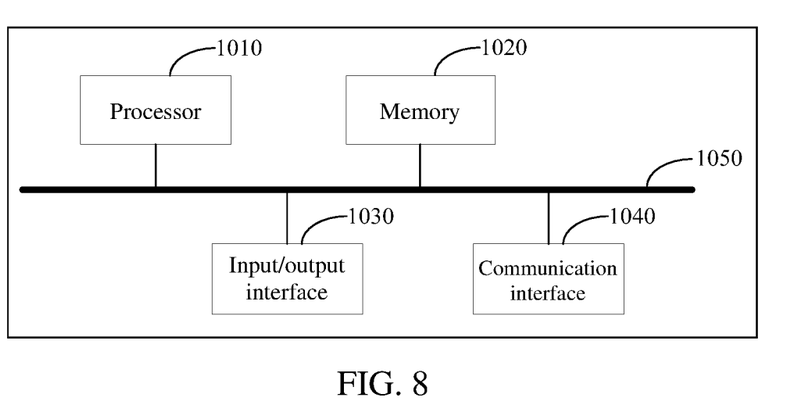
FIG. 8 is a schematic structural diagram of system for configuring the device of the embodiment of the specification.

FIG. 8 is a schematic diagram of a detailed hardware structure of a computing device according to an embodiment of the specification. The device may include: a processor 1010, a memory 1020, an input/output interface 1030, a communication interface 1040, and a bus 1050. Communication connection between the processor 1010, the memory 1020, the input/output interface 1030, and the communication interface 1040 in the device is implemented through the bus 1050.

The processor 1010 may be implemented by a general-purpose central processing unit (CPU), a microprocessor, an application-specific integrated circuit (ASIC), or one or more integrated circuits to execute a related program, to implement the technical solution provided in the embodiments of the specification.

The memory 1020 may be implemented by a read only memory (ROM), a random-access memory (RAM), a static storage device, or a dynamic storage device. The memory 1020 may store an operating system and other application programs. When the technical solutions provided in the embodiments of the specification are implemented by software or firmware, relevant program code is stored in the memory 1020 and is called and executed by the processor 1010.

The input/output interface 1030 is used to connect an input/output module to implement information input and output. The input/output module may be configured in the device (not shown in the figure) as a component, or may be externally connected to the device to provide corresponding functions. The input device may include a keyboard, a mouse, a touch screen, a microphone, various sensors, and the like, and the output device may include a display, a speaker, a vibrator, an indicator light, and the like.

The communication interface 1040 is used to connect a communication module (not shown in the figure) to implement communication interaction between the device and other devices. The communication module may implement communication in a wired manner (for example, a Universal Serial Bus (USB) or a network cable), and may also implement communication in a wireless manner (for example, mobile network, Wireless Fidelity (Wi-Fi) or Bluetooth).

The bus 1050 includes a channel, and transmits information between components (such as the processor 1010, the memory 1020, the input/output interface 1030, and the communications interface 1040) of the device.

It may be noted that, although only the processor 1010, the memory 1020, the input/output interface 1030, the communication interface 1040, and the bus 1050 are shown for the above device, in a specific implementation, the device may further include other components necessary for implementing normal operation. In addition, a person skilled in the art may understand that the above device may include only components necessary to implement the solutions of the embodiments of the specification and does not necessarily include all the components shown in the drawings.

An embodiment of the specification further provides a computer-readable storage medium storing a computer program, and the program, when executed by a processor, implements the foregoing model integration method. Specifically, the foregoing integrated model construction method and integrated model optimization method may both be implemented in one device or may be separately implemented in different devices.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device may access. Based on the definition herein, the computer-readable medium does not include transitory computer readable media (transitory media), such as a modulated data signal and a carrier.

A person skilled in the art may clearly understand that the embodiments of the specification may be implemented by using software in addition to a necessary universal hardware platform. Based on such an understanding, the technical solutions in the embodiments of the specification essentially, or the part contributing to the existing technologies may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the specification.

The system, the apparatus, the module or the unit described in the foregoing embodiments may be specifically implemented by a computer chip or an entity or implemented by a product having a certain function. A typical implementation device is a computer, and the specific form of the computer may be a personal computer, a laptop computer, a cellular telephone, a camera phone, a smartphone, a personal digital assistant, a media player, a navigation device, an email transceiver device, a game console, a tablet computer, a wearable device, or a combination thereof.

The embodiments of the specification are all described in a progressive manner, for same or similar parts in the embodiments, refer to these embodiments, and descriptions of each embodiment focus on a difference from other embodiments. Especially, an apparatus embodiment is basically similar to a method embodiment, and therefore is described briefly; for related parts, refer to partial descriptions in the method embodiment. The apparatus embodiment described above is merely exemplary, and the modules described as separate components may or may not be physically separate. When the solutions of the embodiments of the specification are implemented, the functions of the modules may be implemented in one same piece or a plurality of pieces of software and/or hardware. Some or all modules thereof may be selected based on an actual requirement, to implement an objective of the solution in this embodiment. A person of ordinary skill in the art may understand and implement the objective without creative efforts.

The foregoing covers only specific implementations of the embodiments of the specification, a person of ordinary skill in the art may further make various improvements and embellishments without departing from the principles of the embodiments of the specification. Such improvements and embellishments shall fall within the protection scope of the embodiments of the specification.

What is claimed is:

1. A method for model integration, comprising:
   obtaining an integrated model, the integrated model having one integrated output value and a plurality of input values, the plurality of input values corresponding to a plurality of output values of a plurality of independent models;
   performing one or more iterations of an optimizing process until a preset iteration stop condition is satisfied, wherein the optimizing process comprises:
      acquiring a prediction output by the integrated model based on a preset test event set;
      determining an index value of the integrated model based on the prediction output, the index value indicating a performance evaluation of the integrated model;
      if the index value fails to meet a preset performance requirement, optimizing the integrated model based on a preset optimization event set different from the preset test event set by performing at least the following adjustments:
         refitting the integrated model by adjusting a plurality of integration weights in the integrated model respectively corresponding to the plurality of independent models;
         separately refitting one or more of the plurality of independent models by performing operations, comprising:
            adjusting one or more inputs associated with each of the one or more independent models;
            sorting the plurality of independent models based on the plurality of corresponding integration weights;
            selecting for refitting a first independent model of the sorted plurality of independent models that has not been refitted and has a highest integration weight; and
            after selecting the first independent model for refitting, refitting the first independent model; and
         after refitting the first independent model, retraining the first independent model; and
      after the preset iteration stop condition is satisfied, determining the integrated model as acceptable.

2. The method according to claim 1, wherein the preset iteration stop condition comprises a requirement that the index value satisfies the preset performance requirement, or a number of the one or more iterations reaches a preset threshold.

3. The method according to claim 1, wherein optimizing the integrated model comprises:
   refitting the integrated model in a first iteration by adjusting the plurality of integration weights respectively corresponding to the plurality of independent models; and
   if the preset performance requirement is not satisfied:
      separately refitting one or more of the plurality of independent models in one or more subsequent iterations after the first iteration by adjusting the one or more inputs associated with each of the one or more independent models; and
      retraining one or more of the plurality of independent models in one or more subsequent iterations after the first iteration to acquire one or more new independent models after removing input features from or adding input features to each of the one or more independent models.

4. The method according to claim 1, wherein optimizing the integrated model further comprises:
   retraining the integrated model to acquire a new integrated model after removing one or more independent models from the plurality of independent models to provide inputs to the integrated model, or after adding one or more new independent models to the plurality of independent models to provide inputs to the integrated model.

5. The method according to claim 1, wherein retraining the first independent model comprises:
   removing input features from the first independent model or adding input features to the first independent model.

6. The method according to claim 1, wherein obtaining the integrated model comprises:
   obtaining a set of historical event data records, each comprising a plurality of predicted values generated by the plurality of independent models and an integrated label value, wherein each of the plurality of predicted values is within a predicted value range associated with the corresponding independent model;
   dividing the predicted value range associated with the corresponding independent model into a plurality of subintervals, wherein each of the plurality of predicted values falls into one of the plurality of subintervals;
   converting, for each of the set of historical event data records, the plurality of predicted values respectively to a plurality of encoded values;
   obtaining a training data set based on the set of historical event data records, wherein each training data of the training data set is associated with a plurality of eigenvalues determined based on the plurality of corresponding encoded values; and training the integrated model by a supervised learning algorithm based on the training data set.

7. The method according to claim 6, wherein converting, for each of the set of historical event data records, the plurality of predicted values respectively to a plurality of encoded values comprises:

converting the plurality of predicted values respectively to a plurality of One-Hot encoded values, wherein each of the plurality of One-Hot encoded values comprises a plurality of bits, and a quantity of the plurality of bits equals to a quantity of the plurality of subintervals.

8. The method according to claim 6, wherein converting, for each of the set of historical event data records, the plurality of predicted values respectively to a plurality of encoded values comprises:

for each independent model of the plurality of independent models, determining a plurality of weight of evidence (WOE) scores respectively for the plurality of subintervals; and converting each predicted value from the independent model to a WOE score corresponding to a subinterval of the plurality of subintervals in which the each predicted value belongs.

9. A system for model integration, comprising one or more processors and one or more non-transitory computer-readable memories coupled to the one or more processors and configured with instructions executable by the one or more processors to cause the system to perform operations comprising:

obtaining an integrated model, the integrated model having one integrated output value and a plurality of input values, the plurality of input values corresponding to a plurality of output values of a plurality of independent models;

performing one or more iterations of an optimizing process until a preset iteration stop condition is satisfied, wherein the optimizing process comprises:

acquiring a prediction output by the integrated model based on a preset test event set;

determining an index value of the integrated model based on the prediction output, the index value indicating a performance evaluation of the integrated model;

if the index value fails to meet a preset performance requirement, optimizing the integrated model based on a preset optimization event set different from the preset test event set by performing at least the following adjustments:

refitting the integrated model by adjusting a plurality of integration weights in the integrated model respectively corresponding to the plurality of independent models;

separately refitting one or more of the plurality of independent models, wherein the separately refitting comprises:

adjusting one or more inputs associated with each of the one or more independent models;

sorting the plurality of independent models based on the plurality of corresponding integration weights;

selecting for refitting a first independent model of the sorted plurality of independent models that has not been refitted and has a highest integration weight; and after selecting the first independent model for refitting, refitting the first independent model; and after refitting the first independent model, retraining the first independent model;

after the preset iteration stop condition is satisfied, determining the integrated model as acceptable.

10. The system according to claim 9, wherein the preset iteration stop condition comprises a requirement that the index value satisfies the preset performance requirement, or a number of the one or more iterations reaches a preset threshold.

11. The system according to claim 9, wherein optimizing the integrated model comprises:

refitting the integrated model in a first iteration by adjusting the plurality of integration weights respectively corresponding to the plurality of independent models; and if the preset performance requirement is not satisfied:

separately refitting one or more of the plurality of independent models in one or more subsequent iterations after the first iteration by adjusting the one or more inputs associated with each of the one or more independent models; and retraining one or more of the plurality of independent models in one or more subsequent iterations after the first iteration to acquire one or more new independent models after removing input features from or adding input features to each of the one or more independent models.

12. The system according to claim 9, wherein obtaining the integrated model comprises:

obtaining a set of historical event data records, each comprising a plurality of predicted values generated by the plurality of independent models and an integrated label value, wherein each of the plurality of predicted values is within a predicted value range associated with the corresponding independent model;

dividing the predicted value range associated with the corresponding independent model into a plurality of subintervals, wherein each of the plurality of predicted values falls into one of the plurality of subintervals;

converting, for each of the set of historical event data records, the plurality of predicted values respectively to a plurality of encoded values;

obtaining a training data set based on the set of historical event data records, wherein each training data of the training data set is associated with a plurality of eigenvalues determined based on the plurality of corresponding encoded values; and training the integrated model by a supervised learning algorithm based on the training data set.

13. A non-transitory computer-readable storage medium for model integration configured with instructions executable by one or more processors to cause the one or more processors to perform operations comprising:

obtaining an integrated model, the integrated model having one integrated output value and a plurality of input values, the plurality of input values corresponding to a plurality of output values of a plurality of independent models;

performing one or more iterations of an optimizing process until a preset iteration stop condition is satisfied, wherein the optimizing process comprises:

acquiring a prediction output by the integrated model based on a preset test event set;

determining an index value of the integrated model based on the prediction output, the index value indicating a performance evaluation of the integrated model;

if the index value fails to meet a preset performance requirement, optimizing the integrated model based on a preset optimization event set different from the preset test event set by performing at least the following adjustments:

refitting the integrated model by adjusting a plurality of integration weights in the integrated model respectively corresponding to the plurality of independent models;

separately refitting one or more of the plurality of independent models, wherein the separately refitting comprises:

adjusting one or more inputs associated with each of the one or more independent models;

sorting the plurality of independent models based on the plurality of corresponding integration weights;

selecting for refitting a first independent model of the sorted plurality of independent models that has not been refitted and has a highest integration weight; and after selecting the first independent model for refitting, refitting the first independent model; and after refitting the first independent model, retraining the first independent model; and after the preset iteration stop condition is satisfied, determining the integrated model as acceptable.

14. The non-transitory computer-readable storage medium according to claim 13, wherein the preset iteration stop condition comprises a requirement that the index value satisfies the preset performance requirement, or a number of the one or more iterations reaches a preset threshold.

15. The non-transitory computer-readable storage medium according to claim 13, wherein optimizing the integrated model comprises:

refitting the integrated model in a first iteration by adjusting the plurality of integration weights respectively corresponding to the plurality of independent models; and if the preset performance requirement is not satisfied:

separately refitting one or more of the plurality of independent models in one or more subsequent iterations after the first iteration by adjusting the one or more inputs associated with each of the one or more independent models; and retraining one or more of the plurality of independent models in one or more subsequent iterations after the first iteration to acquire one or more new independent models after removing input features from or adding input features to each of the one or more independent models.

16. The non-transitory computer-readable storage medium according to claim 13, wherein retraining the first independent model comprises:

removing input features from the first independent model or adding input features to the first independent model.

17. The non-transitory computer-readable storage medium according to claim 13, wherein obtaining the integrated model comprises:

obtaining a set of historical event data records, each comprising a plurality of predicted values generated by the plurality of independent models and an integrated label value, wherein each of the plurality of predicted values is within a predicted value range associated with the corresponding independent model;

dividing the predicted value range associated with the corresponding independent model into a plurality of subintervals, wherein each of the plurality of predicted values falls into one of the plurality of subintervals;

converting, for each of the set of historical event data records, the plurality of predicted values respectively to a plurality of encoded values;

obtaining a training data set based on the set of historical event data records, wherein each training data of the training data set is associated with a plurality of eigenvalues determined based on the plurality of corresponding encoded values; and training the integrated model by a supervised learning algorithm based on the training data set.

18. The method of claim 1, wherein the integrated model is a risk control model, and each of the plurality of independent models is a risk control model corresponding to a risk type.

19. The system of claim 9, wherein the integrated model is a risk control model, and each of the plurality of independent models is a risk control model corresponding to a risk type.

20. The non-transitory computer-readable storage medium of claim 13, wherein the integrated model is a risk control model, and each of the plurality of independent models is a risk control model corresponding to a risk type.

* * * * *